(12) United States Patent
Miyazaki

(10) Patent No.: US 6,600,699 B2
(45) Date of Patent: Jul. 29, 2003

(54) APPARATUS FOR SEARCHING OF RECORDED INFORMATION

(75) Inventor: Eiji Miyazaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/864,684

(22) Filed: May 24, 2001

(65) Prior Publication Data

US 2001/0046190 A1 Nov. 29, 2001

(30) Foreign Application Priority Data

May 24, 2000 (JP) .................................. 2000-003482 U

(51) Int. Cl.$^7$ ............................................... G11B 7/085
(52) U.S. Cl. ................................ 369/30.15; 360/78.07; 386/126
(58) Field of Search ..................... 369/30.15; 386/126; 360/78.07

(56) References Cited

U.S. PATENT DOCUMENTS

| | | | | |
|---|---|---|---|---|
| 4,536,863 A | * | 8/1985 | Giddings ............. | 369/30.15 X |
| 4,701,898 A | * | 10/1987 | Giddings ................. | 369/30.15 |
| 4,716,558 A | * | 12/1987 | Katayama et al. ....... | 369/30.15 |
| 5,218,453 A | * | 6/1993 | Hashimoto ........... | 369/30.15 X |
| 5,956,299 A | * | 9/1999 | Aoki ........................ | 369/30.15 |
| 5,970,028 A | * | 10/1999 | Shimabukuro ........... | 369/30.08 |
| 6,091,674 A | * | 7/2000 | Tozaki et al. ............. | 369/30.04 |

FOREIGN PATENT DOCUMENTS

| | | |
|---|---|---|
| JP | 4-93941 | 8/1992 |
| JP | 5-53035 | 8/1993 |
| JP | 3012988 | 4/1995 |
| JP | 3012990 | 4/1995 |
| JP | Hei. 08-212756 | 8/1996 |
| JP | Hei. 09-147534 | 6/1997 |
| JP | Hei. 9-198668 | 7/1997 |
| JP | Hei. 09-198853 | 7/1997 |
| JP | Hei. 11-053850 | 2/1999 |

OTHER PUBLICATIONS

English translation of JP 4–93941.*
Machine translation of JP 08–212756.*
Machine translation of JP 09–198853.*
Machine translation of JP 09–147534.*
Machine translation of JP 11–053850.*
Patent Abstracts of Japan, Publication No. 11–053850; dated Feb. 26, 1999.
Patent Abstracts of Japan, Publication No. 09–198668; dated Jul. 31, 1997.
Patent Abstracts of Japan, Publication No. 09–198853; dated Jul. 31, 1997.
Patent Abstracts of Japan, Publication No. 09–147534; dated Jun. 6, 1997.
Patent Abstracts of Japan, Publication No. 08–212756, dated Aug. 20, 1996.

* cited by examiner

Primary Examiner—Aristotelis M Psitos
(74) Attorney, Agent, or Firm—Rosenthal & Osha L.L.P.

(57) ABSTRACT

To provide a disk unit wherein a prompt search is enabled even if the recorded time of one track is long, if the total recorded time of one track is below five minutes, a search mode is set to a small jump mode in which a search is performed at a short step. If the total recorded time of one track is over 5 minutes, thirty minutes or below thirty minutes for example, a search mode is set to an intermediate jump mode in which a search is performed at an intermediate step and the small jump mode. In case the total recorded time of one track exceeds thirty minutes for example, a search mode is set to a time jump mode in which a jump by input time is performed, the intermediate jump mode and the small jump mode.

9 Claims, 9 Drawing Sheets

APPARATUS FOR SEARCHING OF RECORDED INFORMATION

BACKGROUND OF THE INVENTION

1. Field of the Invention

The present invention relates to a disk unit such as an MD player, particularly relates to a disk unit wherein a prompt search of recorded information is enabled in reproducing or editing a disk.

2. Description of the Related Art

In a disk unit that reproduces information on a disk such as a rewritable mini disc (MD), in case reproduction is performed on the way of a tune and editing such as the division of a tune, the combination of tunes and the partial deletion of a tune is performed, reproduction and editing are performed by a jump up to a target record position using a search button. To promptly and precisely perform such a search, various methods are heretofore proposed.

Japanese Patent Publication No. Hei. 9-198668 discloses a disk unit wherein in case one track jump operation is executed, a pickup is moved to the inner side of a target position by few tracks jump operation when the target position of the pickup is located on the inner side of a disk, and afterward the pickup is securely moved to the target position by one track jump operation.

Also, Japanese Patent Publication No. Hei. 11-53850 discloses a disk unit wherein distance to move a pickup is acquired based upon the current position and a target position and a search at high speed is enabled by setting so that a position when the movement is finished is short in the direction of the search.

Also, Japanese Examined Patent Publication No. 5-53035 discloses a disk unit wherein access time to a target address is reduced by controlling the movement of a pickup corresponding to the result of comparison between the number of sectors corresponding to difference between the target address and the current address and the number of sectors per one track on which the target address is located.

Further, Japanese Utility Model Registration No. 3012988 discloses a disk unit wherein in case a rapid traverse key is operated, time required for rapid transverse can be reduced by continuously releasing control operation by a tracking servo mechanism and moving an optical pickup at high speed. Japanese Utility Model Registration No. 3012990 discloses a disk unit wherein in case a rapid transverse key is operated, a search of a target track can be easily performed by executing tracking servo control, controlling the rotation of an optical disc at higher speed than normal speed.

In case recording is performed by input from an external device and input via a microphone in an MD player, there are two recording modes of autotrack marking and manual track marking. In autotrack marking, in case a silent interval continues for predetermined time (for example, for three seconds) in recording, the next track is automatically allocated to the following recording and the number of a tune is allocated. Therefore, the more silent intervals are, the more the number of recording tracks is. In the meantime, in manual track marking, a track is specified and one tune is continuously recorded on this track. Therefore, even if there is a silent interval in recording, a magnetic head is not moved to a new track and the silent interval is recorded on the specified track as it is. Therefore, when performance in a concert is recorded in manual track marking, there is a case that the recorded time of one track is 60 minutes or 80 minutes and is a long time.

In case recording is performed in autotrack marking, a search can be performed by a jump in units of track because one tune is divided into multiple tracks. Therefore, even if a part close to the end of a long tune is reproduced or edited, it does not take muck time to search the part. In the meantime, in case recording is performed in manual track marking, a search in units of track is disabled and as a search up to the way of one track is required, considerable time is required for a search in case a part close to the end of a long tune is reproduced or edited.

That is, to search up to the way of a track, a search button continues to be pressed, rapid transverse or quick reverse is performed and a finger has only to be separated from the button at a target location, however, a step of this search is normally a few seconds and is short. Therefore, as shown in FIG. 10A, in case the recorded time of one track No. 1 is three minutes for example, it does not take much time to reach a target location P, however, as shown in FIG. 10B, in case the recorded time of one track No. 1 is 60 minutes for example, a search button is required to continue to be pressed until the target location P is reached and it takes considerable time to search. However, in a conventional type disk unit, such a point is not considered and the conventional type disk unit has a problem that it is hard for a user to use.

SUMMARY OF THE INVENTION

The invention is made to solve the above problems, and an object of the invention is to provide a disk unit wherein a prompt search is also enabled in case the recorded time of one track is long.

To achieve the object, the disk unit according to the invention is provided with a search button for searching a location to be reproduced or edited of information recorded on a disk and a search mode controller that controls a mode of a search by the search button, and the search mode controller sets a mode of a search in a track according to the total recorded time of one track recorded by manual track marking.

For example, in case the total recorded time of one track is below 5 minutes, a search mode is set to a small jump mode in which a search is performed at a short step (for example, in units of a few seconds). In this case, as recorded time is short, a search in units of a few seconds comes into no question. Also, in case the total recorded time of one track is over five minutes, thirty minutes or below thirty minutes for example, a search mode is set to an intermediate jump mode in which a search is performed at an intermediate step (for example, in units of a few tens seconds) and the small jump mode. Also, in case the total recorded time of one track exceeds thirty minutes for example, a search mode is set to a time jump mode in which a jump by input time is performed, the intermediate jump mode and the small jump mode. In this case, as a jump up to a location of specified time is performed at one stroke in the time jump mode, search speed can be further enhanced.

In case a time zone is divided into two in addition to the case that the time zone is divided into three and the total recorded time of one track is below thirty minutes for example, a search mode may be also set to the small jump mode and the intermediate jump mode and in case the total recorded time exceeds thirty minutes for example, a search mode may be also set to the time jump mode, the intermediate jump mode and the small jump mode. In case the total recorded time of one track is below thirty minutes for example, a search mode may be also set to only the small jump mode and in case the total recorded time exceeds thirty minutes for example, a search mode may be also set to the time jump mode and the small jump mode.

In place of the time jump mode, a search mode may be also set to a block jump mode in which a jump is performed in units of block in case one track is divided into the predetermined number of blocks. In this case, as a jump is performed up to a specified block at one stroke, a high-speed search is also enabled.

Further, in place of the total recorded time, a search mode may be also set according to the residual recorded time of a track being reproduced.

As described above, in the invention, a search can be efficiently performed in an optimum mode according to recorded time by setting a search mode according to the total recorded time of one track or the residual recorded time and even if reproduction or editing is performed on the way of a track having long recorded time, search time can be greatly reduced.

DETAILED DESCRIPTION OF THE PRESENT INVENTION

The present invention will be described in detail with reference to the accompanying drawings.

Figure 1:
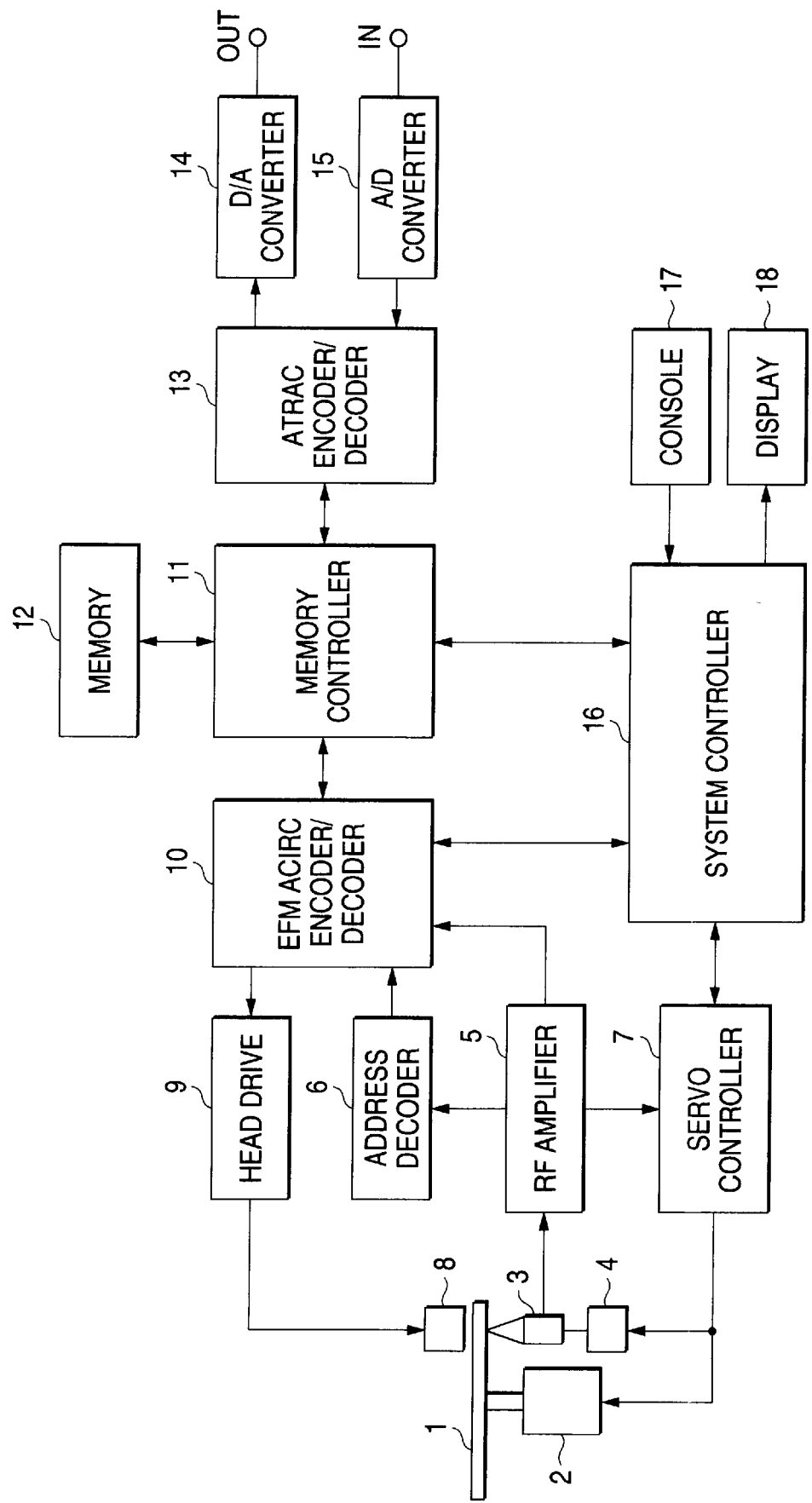
FIG. 1 is a block diagram showing an example of a disk unit according to an embodiment of the invention.

FIG. 1 is a block diagram showing an example of a disk drive according to an embodiment of the invention. As shown in FIG. 1, a reference numeral 1 denotes a disk such as MD, 2 denotes a spindle motor that rotates the disk 1, 3 denotes an optical pickup that radiates a laser beam on the disk 1 and reads information recorded on the disk 1 by its reflected light and 4 denotes a slide motor for operating the optical pickup 3.

A reference numeral 5 denotes an RF amplifier that amplifies the output of the optical pickup 3, 6 denotes an address decoder that detects the address of a track based upon the output of the RF amplifier, 7 denotes a servo controller that controls the spindle motor 2 and the slide motor 4 based upon the output of the RF amplifier, 8 denotes a magnetic head for recording on the disk 1 and 9 denotes a head drive that drives the magnetic head 8.

A reference numeral 10 denotes an eight to fourteen modulation (EFM) advanced cross interleave read Solomon code (ACIRC) encoder/decoder and a signal read from the disk 1 is converted to compressed digital data here. A reference numeral 11 denotes a vibration-resistant memory controller and the memory controller controls so that the compressed data is stored in a memory 12 and is read from the memory 12. The memory 12 is formed by DRAM for example. A reference numeral 13 denotes an adaptive transform acoustic coding (ATRAC) encoder/decoder and the ATRAC encoder/decoder expands compressed data stored in the memory 12 to restore it to original data. The restored digital data is sent to a D/A converter 14, is converted to analog data here and is output as voice.

A reference numeral 15 denotes an A/D converter and the A/D converter converts an input analog aural signal to digital data. The converted data is compressed by the ATRAC encoder/decoder 13 and is modulated by the EFM ACIRC encoder/decoder 10 via the memory controller 11. The modulated data is sent to the head drive 9 and is written to the disk 1 by the magnetic head 8.

A reference numeral 16 denotes a system controller including CPU, a memory and others and the system controller controls the servo controller 7, the EFM ACIRC encoder/decoder 10 and the memory controller 11. The system controller 16 forms a search mode controller according to the invention. A reference numeral 17 denotes a console including a key and a switch for executing various operation and 18 denotes a display such as a liquid crystal display for displaying the information of the disk and others. The configuration itself of the above-mentioned disk unit is similar to that of a conventional type.

Figure 2:
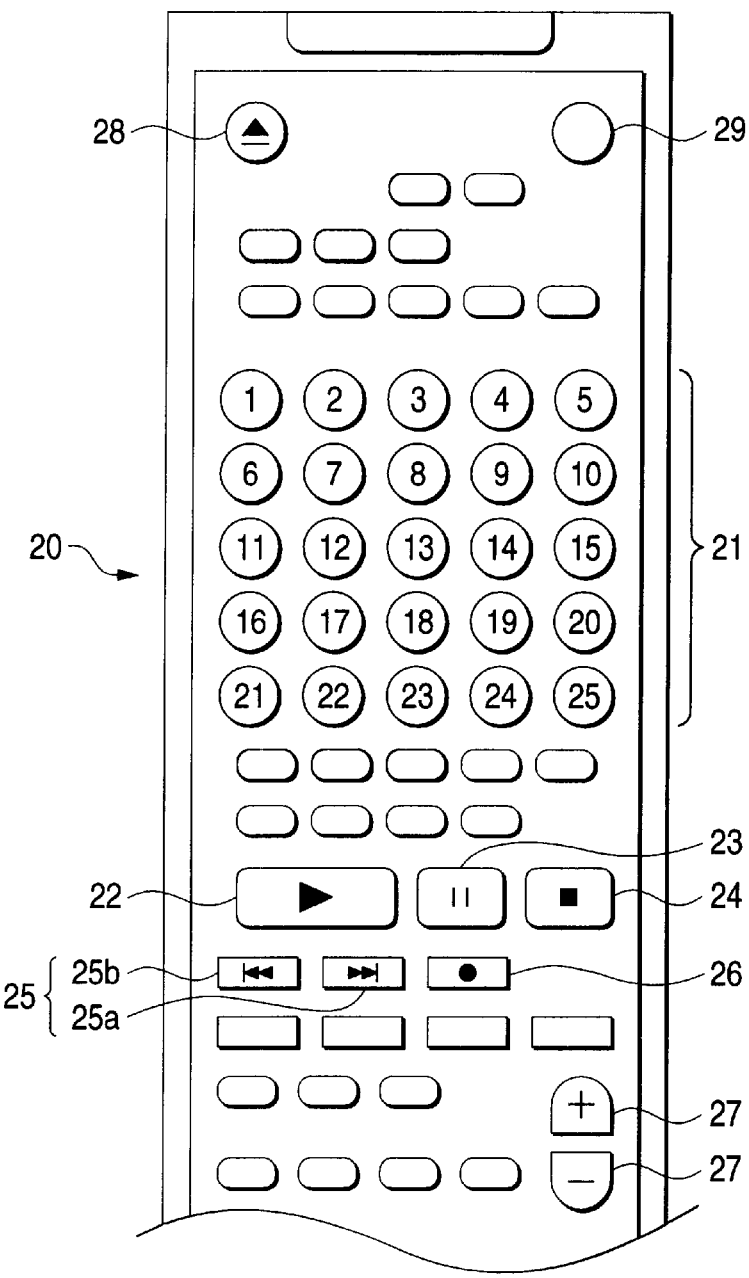
FIG. 2 shows an example of a remote console.

FIG. 2 shows an example of a remote console 20 forming the console 17. As shown in FIG. 2, a reference numeral 21 denotes a numerical button for inputting a digit, 22 denotes a reproducing button for reproducing the disk 1, 23 denotes a temporary stop button for temporarily stopping reproduction, 24 denotes a stop button for stopping reproduction, 25 denotes a search button including a rapid traverse button 25a and a quick reverse button 25b, 26 denotes a recording button for recording on the disk 1, 27 denotes volume buttons for controlling a loudness level in reproduction, 28 denotes an ejection button for ejecting the disk 1 and 29 denotes a power button for turning on/off power supply.

Every time the search button 25 is pressed, the magnetic head is moved to a track forward or backward by one track and when the search button continues to be pressed, rapid traverse or quick reverse in a track is performed. That is, when the rapid traverse button 25a is pressed once, the magnetic head is moved to a track forward by one track, in other wards, is moved to the next tune of a program and when the rapid traverse button is pressed twice, the magnetic head is moved to a track forward by two tracks and in other words, is moved to a tune forward by two tunes. When the quick reverse button 25b is pressed once, the magnetic head is moved to a track backward by one track, in other words, is moved to the former tune and when the quick reverse button is pressed twice, the magnetic head is moved to a track backward by two tracks and in other words, is moved to a tune former by two tunes. In the meantime, when the rapid traverse button 25a continues to be pressed, rapid traverse in a track is performed and when a finger is separated from the button in a target position, reproduction is started from the part. When the quick reverse button 25b continues to be pressed, quick reverse in a track is performed and when a finger is separated from the button in a target position, reproduction is started from the part. These functions themselves are heretofore known, however, in the invention, a search step in the case of rapid traverse or quick reverse is not uniform as in the conventional type and varies according to the total recorded time of one track. The details will be described later.

Figure 3:
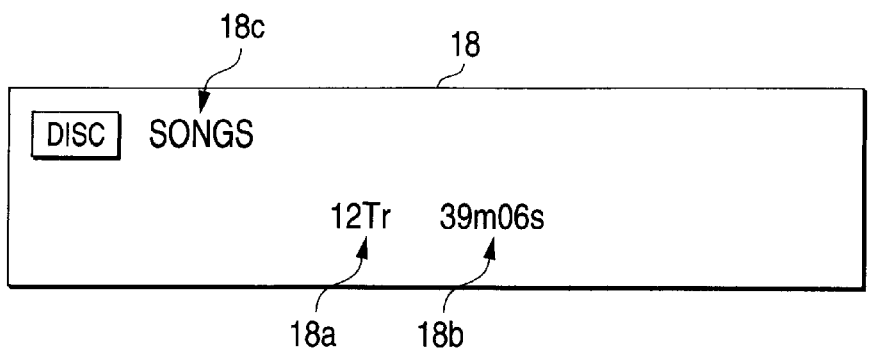
FIG. 3 shows an example of display on a display.

FIG. 3 shows an example of display on the display 18. In FIG. 3, information read from a table of contents (TOC) when the disk 1 is set is displayed. A reference numeral 18a shows that the number of the total tracks (tunes) of the disk is 12 and 18b shows that the total recorded time (the total performance time) of the disk is 39 minutes 6 seconds. A reference numeral 18c denotes the title of the disk. On the display 18, in addition, information such as the title of a tune being reproduced, a track number (a tune number), performance elapsed time, performance residual time, setting information set by the operation of the remote console 20 and others are displayed.

Figure 4A:
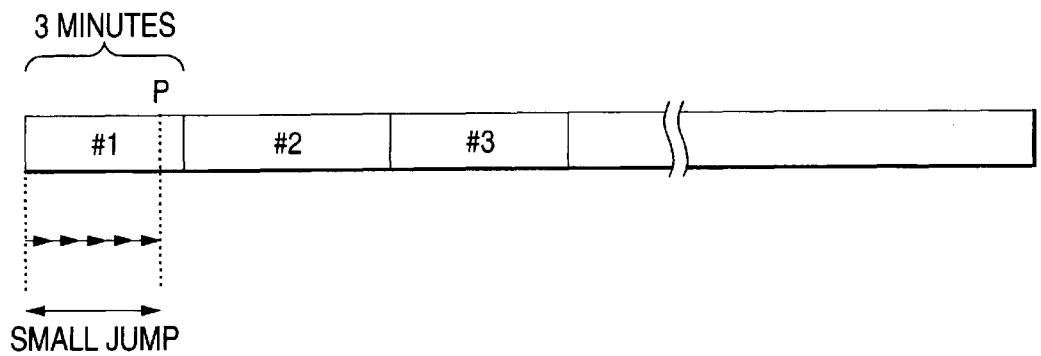
FIGS. 4A to 4C are explanatory drawings for explaining search operation.
Figure 4B:
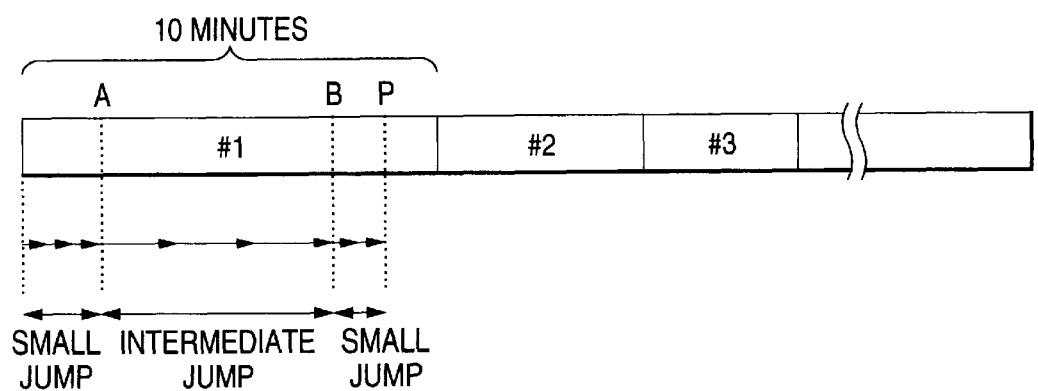
Figure 4C:
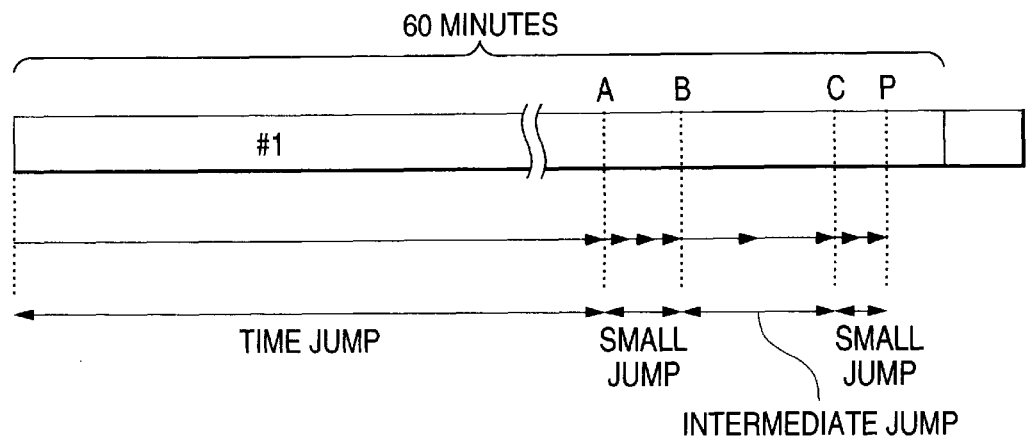

FIGS. 4A to 4C are explanatory drawings for explaining search operation in the above-mentioned disk unit. No. 1, No. 2 and No. 3 respectively show one track, and voice information recorded by manual track marking is recorded in each track. FIG. 4A shows an example that a search is performed up to a target location P in case the recorded time of the track No. 1 is three minutes and the target location P to be reproduced or edited is in a position where 2 minutes 30 seconds elapse from the start of reproduction for example. At this time, a mode is set to a small jump mode. That is, when the rapid traverse button 25a continues to be pressed after the reproduction of the track No. 1 is started, a search is performed at a short step equivalent to a few seconds. Search operation in the small jump mode is similar to that in the conventional type, however, as the recorded time of the track No. 1 is three minutes and is short, it does not take much time to search up to the target location P even with the short step. Therefore, there is practically no problem.

FIG. 4B shows an example that a search is performed up to a target location P in case the recorded time of the track No. 1 is ten minutes and the target location P to be reproduced or edited is in a position where nine minutes elapse from the start of reproduction for example. At this time, a mode is set to the small jump mode and an intermediate jump mode. That is, when the rapid traverse button 25a continues to be pressed after the reproduction of the track No. 1 is started, a search in the small jump mode at a short step equivalent to a few seconds is at first performed, however, the short step automatically changes to an intermediate step equivalent to a few tens seconds from a position A and a search in the intermediate jump mode is performed.

When a finger is separated from the rapid transverse button 25a in a position B after rapid transverse is performed to some extent in the intermediate jump mode, reproduction is performed from the position, however, as the target location P is not reached yet, the rapid transverse button 25a is pressed again and a search in the small jump mode is performed. In the example shown in FIG. 4B, as the target location P is reached during the search in the small jump mode, the search is finished by separating a finger from the rapid transverse button 25a in this position. As described above, search time up to the target location P is reduced by searching the middle of a track in the intermediate jump mode at high speed, compared with a search only in the small jump mode.

FIG. 4C shows an example that a search is performed to a target location P in case the recorded time of the track No. 1 is 60 minutes and the target location P to be reproduced or edited is in a position where 50 minutes elapse from the start of reproduction for example. At this time, a mode is set to a time jump mode, a small jump mode and an intermediate jump mode. In this case, first, rough time from the start of reproduction to the target location P is estimated and the time (for example, 45 minutes) is input via the numerical button 21 shown in FIG. 2 of the remote console 20.

When the rapid transverse button 25a is pressed after the reproduction of the track No. 1 is started, steps equivalent to the input time are jumped and a position A is reached at one stroke. As the position is not the target location P, a search in the small jump mode and in the intermediate jump mode is performed from here. That is, when the rapid transverse button 25a continues to be pressed, a search in the small jump mode is started as described above, the small jump mode is automatically switched to the intermediate jump mode from a position B and a search is performed.

When a finger is separated from the rapid transverse button 25a in a position C after rapid transverse is performed to some extent in the intermediate jump mode, reproduction is started from the position, however, as the position C is not also the target location P, the rapid transverse button 25a is pressed again and a search in the small jump mode is performed. In the example shown in FIG. 4C, as the target location P is reached during the search in the small jump mode, the search is finished by separating a finger from the rapid transverse button 25a in this position. As described above, in case the recorded time of one track is long, search time up to the target location P is greatly reduced by the search in the time jump mode, compared with a search only in the intermediate jump mode and the small jump mode.

Figure 5:
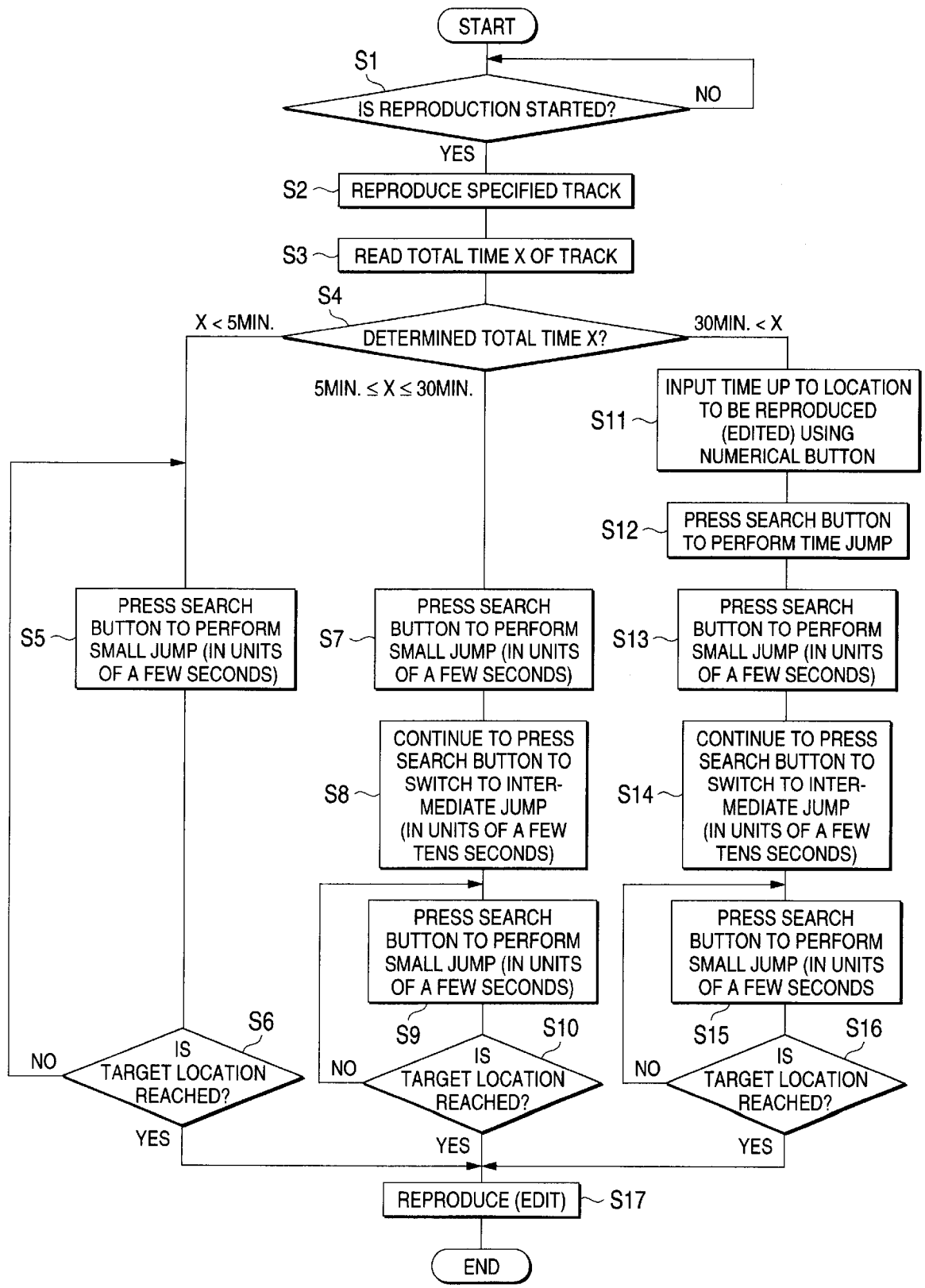
FIG. 5 is a flowchart showing search operation.

FIG. 5 is a flowchart showing the above-mentioned search operation and shows a procedure executed as a program run in the system controller 16 shown in FIG. 1. Referring to FIGS. 1 to 5, search operation will be more detailedly described below.

When a reproduction start signal is input from the console 17 to the system controller 16 (a step S1) by pressing the reproduction button 22 shown in FIG. 2 of the remote console 20, the disk 1 is rotated by the spindle motor 2, information recorded on the disk 1 is read by the optical pickup 3 and the reproduction operation of a specified track is executed (a step S2). Next, the total recorded time X of the track being reproduced is read from the disk 1 (a step S3). The total recorded time X is recorded in the TOC of the disk 1. Next, it is determined whether the read total recorded time X corresponds to any of X<5 minutes, 5 minutes$\leq$X$\leq$30 minutes and 30 minutes<X or not (a step S4). The values of 5 minutes and 30 minutes in this case are a mere example and may be also a value except these. The system controller 16 sets a search mode respectively according to the above three cases as follows.

In case X<5 minutes, only a small jump mode is set. Therefore, as described in relation to FIG. 4A, a search is performed at a step in units of a few seconds by pressing the search button (the rapid transverse button 25a) (a step S5). The search in the small jump mode is performed until the target location P is reached (a step S6) and when the target location P is reached, the search is completed by separating a finger from the search button. Afterward, reproduction in the target location P and predetermined editing work are performed (a step S17).

In case 5 minutes$\leq$X$\leq$30 minutes, the small jump mode and the intermediate jump mode are set. Therefore, as described in relation to FIG. 4B, a search in the small jump mode is at first performed by pressing the search button (the rapid transverse button 25a) (a step S7) and when the search button continues to be pressed, the small jump mode is automatically switched to the intermediate jump mode in the position A and a high-speed search is performed (a step S8). Afterward, when a finger is separated from the search button in the position B, reproduction is started, however, as the position B is not the target location P, a search in the small jump mode is performed by pressing the search button again (a step S9). When the target location P is reached (a step S10), the search is completed by separating a finger from the search button. Afterward, reproduction at the target location P and predetermined editing work are performed (the step S17).

In case 30 minutes<X, the time jump mode, the small jump mode and the intermediate jump mode are set. Therefore, as described in relation to FIG. 4C, time at a location to be reproduced or edited is first input using the numerical button 21 of the remote console 20 (a step S11). At this time, the display 18 shows display such as JUMP ○○ minutes xx seconds. Next, when the search button (the rapid transverse button 25a) is pressed, a jump up to the position A equivalent to the input time is performed (a step S12). However, as the position A is not the target location P, a search in the small jump mode is performed by pressing the search button again (a step S13) and when the search button continues to be pressed, the small jump mode is automatically switched to the intermediate jump mode in the position B (a step S14). Afterward, when a finger is separated from the search button in the position C, reproduction is started, however, as the target location P is not reached yet, a search in the small jump mode is performed by pressing the search button again (a step S15). When the target location P is reached (a step S16), the search is completed by separating a finger from the search button. Afterward, reproduction at the target location P and predetermined editing work are performed (the step S17).

In case the target location P is passed by an intermediate jump and a time jump, a search in a reverse direction has only to be performed by pressing the quick reverse button 25b. When the quick reverse button 25b also continues to be pressed as in the case of the rapid transverse button 25a, a search in the small jump mode is at first performed and the small jump mode is automatically switched to the intermediate jump mode halfway.

Figure 6A:
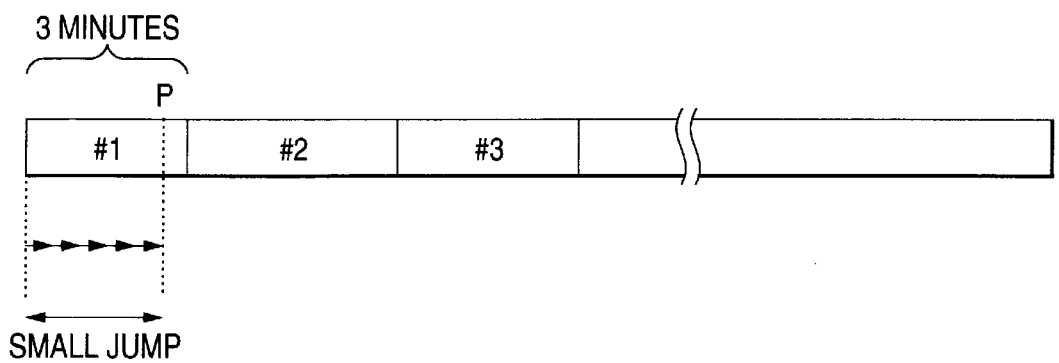
FIGS. 6A to 6C are explanatory drawings for explaining search operation in another embodiment.
Figure 6B:
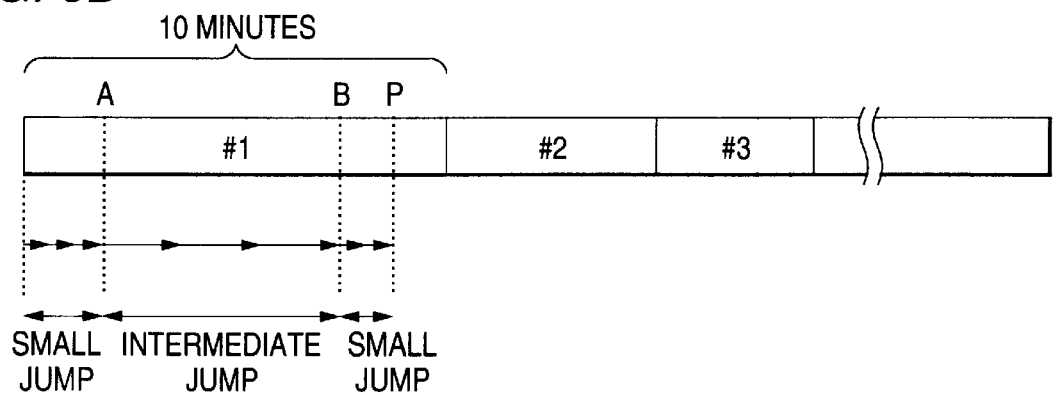
Figure 6C:
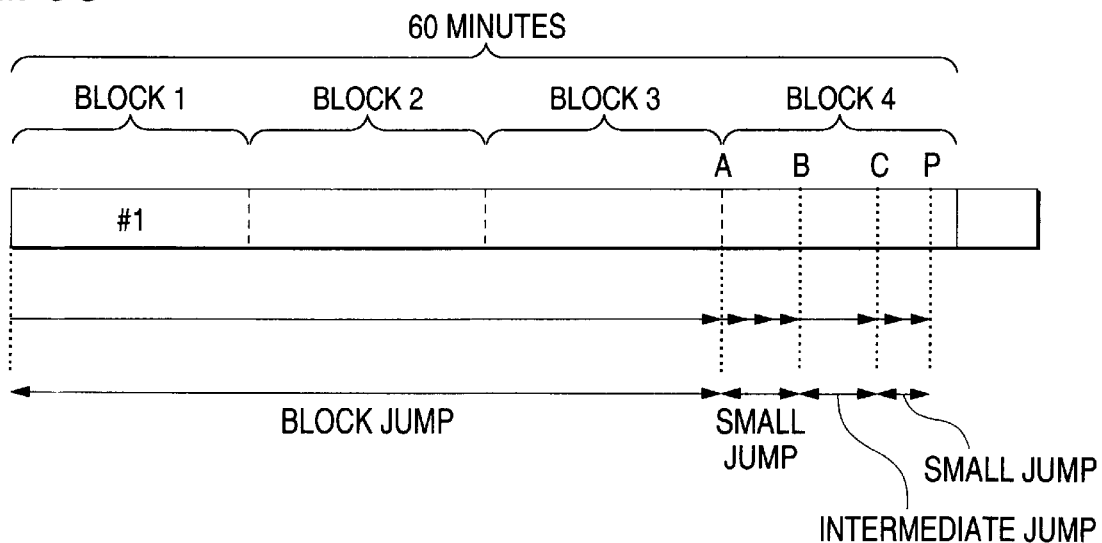

FIGS. 6A to 6C are explanatory drawings for explaining search operation in another embodiment of the invention. The description of FIGS. 6A and 6B is omitted because search operation shown in FIGS. 6A and 6B is the same as that shown in FIGS. 4A and 4B. In FIG. 6C, the operation of a block jump is performed in place of the time jump shown in FIG. 4C. That is, one track No. 1 is divided into plural blocks N and a jump up to the end of a specified block is enabled by specifying any block. A position (time) at the end of each block is automatically set by dividing the total recorded time X of a track No. 1 into N. In the invention, it may be constructed that the user can change the number of blocks divided.

A case that a track is divided into four blocks, a block 3 is specified and jump operation is executed is shown as one example. At this time, a mode is set to a block jump mode, a small jump mode and an intermediate jump mode. In this case, first, it is estimated in which block a target location P is included and the number of the block is input via the numerical button 21 shown in FIG. 2 of the remote console 20. In this case, 3 is input as a block number.

When the rapid transverse button 25a is pressed after the reproduction of the track No. 1 is started, a jump up to the end of the block 3 is performed and control is passed to a position A at one stroke. As this position is not a target location P, a search in the small jump mode and the intermediate jump mode is performed as in the case shown in FIGS. 4A to 4C and the search is finished by separating a finger from the rapid transverse button 25a at the target location P. As described above, search time is also greatly reduced by performing the search in the block jump mode.

Figure 7:
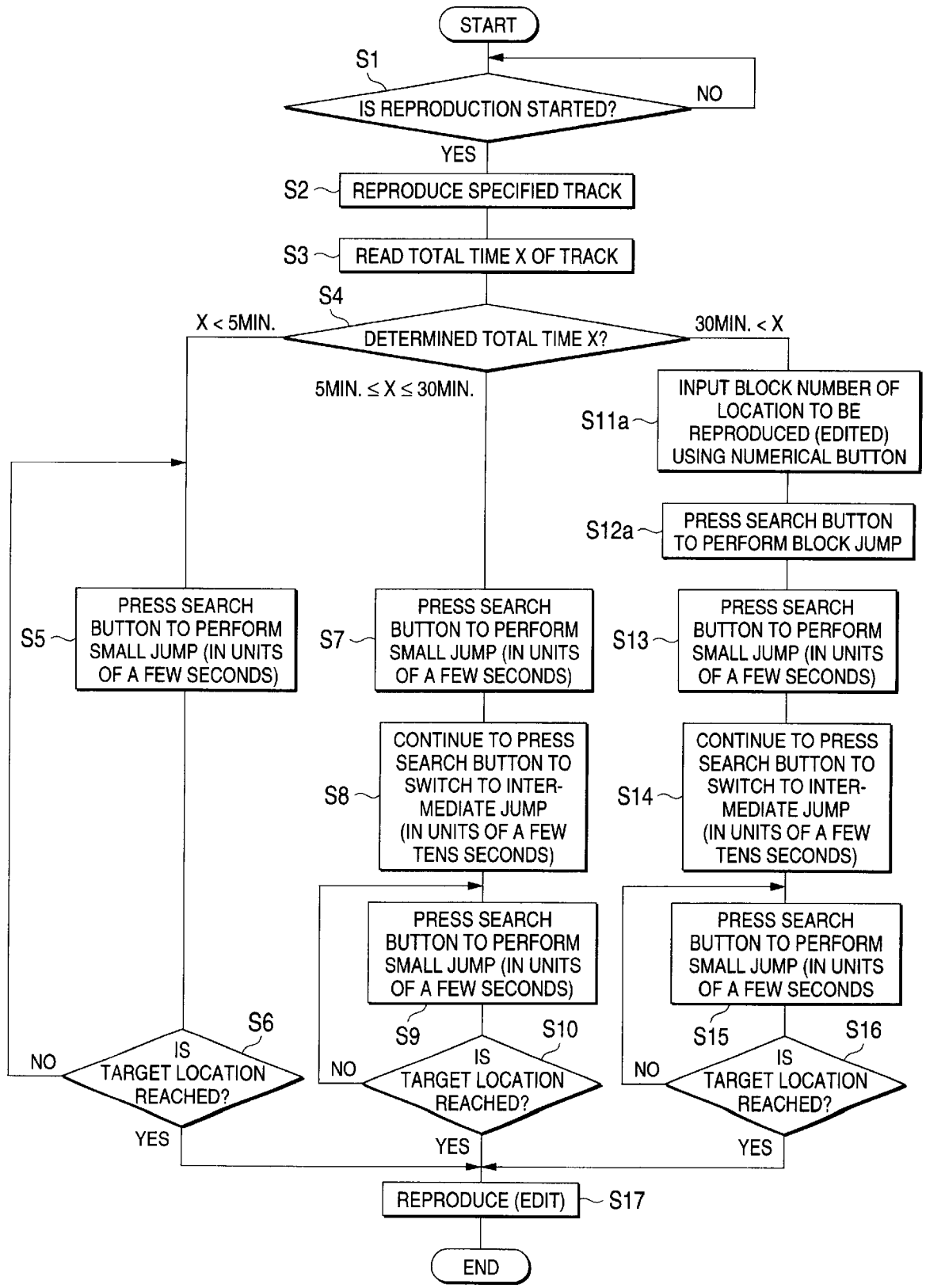
FIG. 7 is a flowchart showing the search operation in another embodiment.

FIG. 7 is a flowchart showing the operation shown in FIGS. 6A to 6C and the same reference numeral is allocated to the same step as the step shown in FIG. 5. FIG. 7 is different from FIG. 5 in that the steps S11 and S12 shown in FIG. 5 are replaced by steps S11a and S12a and is the same as FIG. 5 in other points. In the step S11a, the number of a block to be reproduced or edited is input using the numerical button 21 of the remote console 20. At this time, the display 18 shows display such as JUMP block 3. Next, when the search button (the rapid transverse button 25a) is pressed, a jump up to the position A at the end of the block 3 is performed (the step S12a). As the following steps S13 to S17 are the same as those shown in FIG. 5, the description is omitted.

Figure 8:
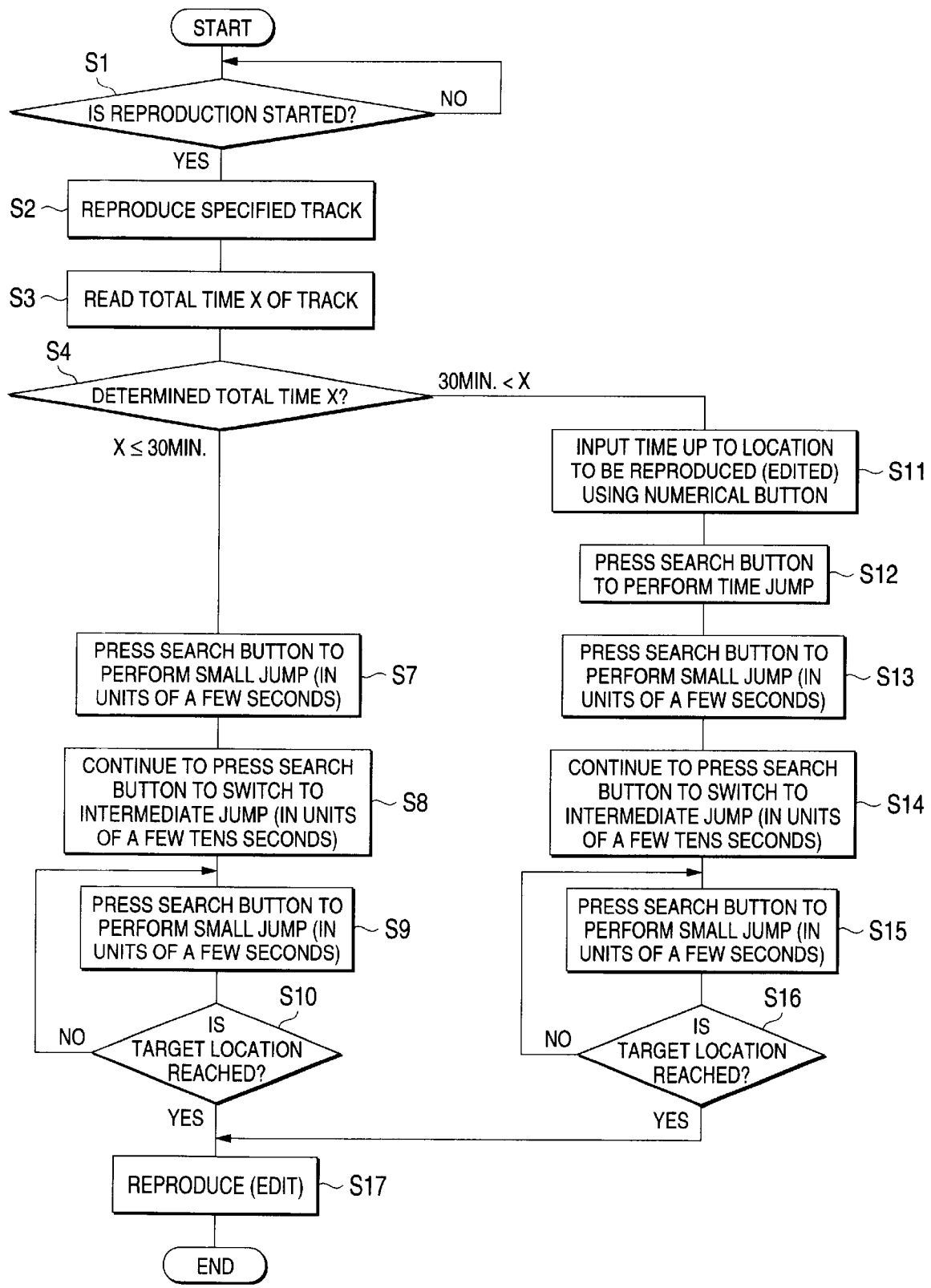
FIG. 8 is a flowchart showing search operation in another embodiment.

In FIGS. 5 and 7, the total recorded time X of one track is divided into the three cases, however, the total recorded time may be also divided into two cases with certain time as a criterion. FIG. 8 is a flowchart showing an embodiment in this case and is a transformed example of FIG. 5. In this case, search modes are put to proper use depending upon whether the total recorded time X is X≦30 minutes or 30 minutes<X. That is, in case X≦30 minutes, a small jump mode and an intermediate jump mode are set and the operation in the steps S7 to S10 and the step S17 described in relation to FIG. 5 is executed. In case 30 minutes<X, a time jump mode, the small jump mode and the intermediate jump mode are set and the operation in the steps S11 to S17 described in relation to FIG. 5 is executed. The steps S11 and S12 can be also replaced with the steps S11a and S12a shown in FIG. 7 and a block jump mode can be also adopted.

Figure 9:
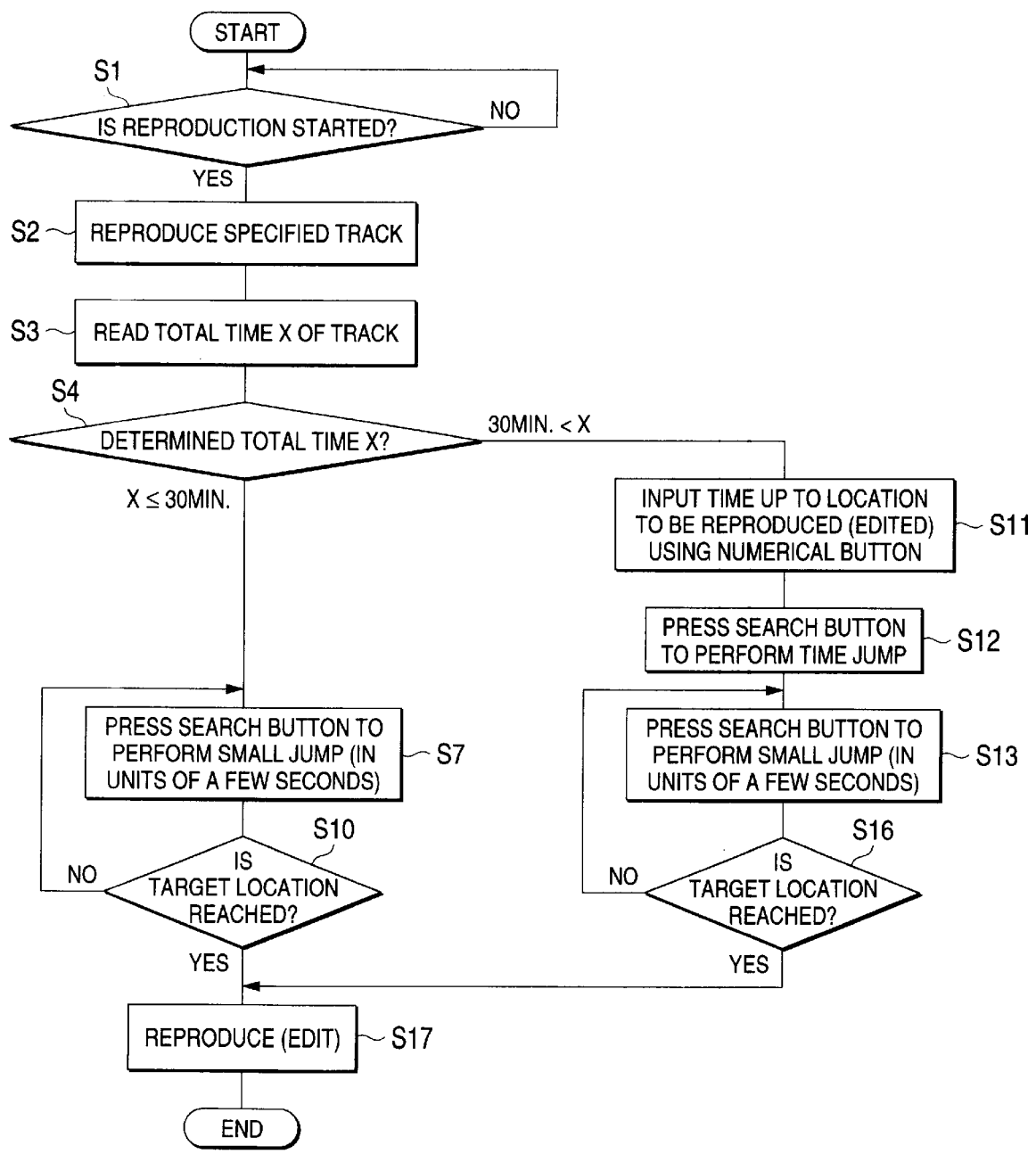
FIG. 9 is a flowchart showing search operation in the other embodiment.
Figure 10A:
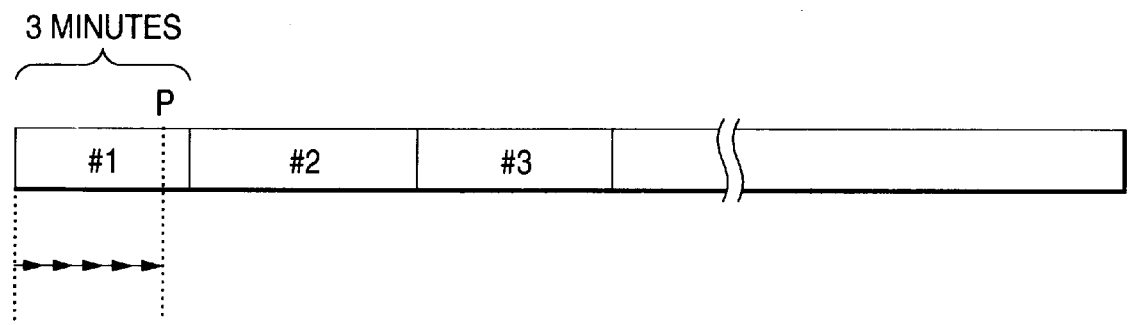
FIGS. 10A and 10B are explanatory drawings for explaining conventional type search operation.
Figure 10B:
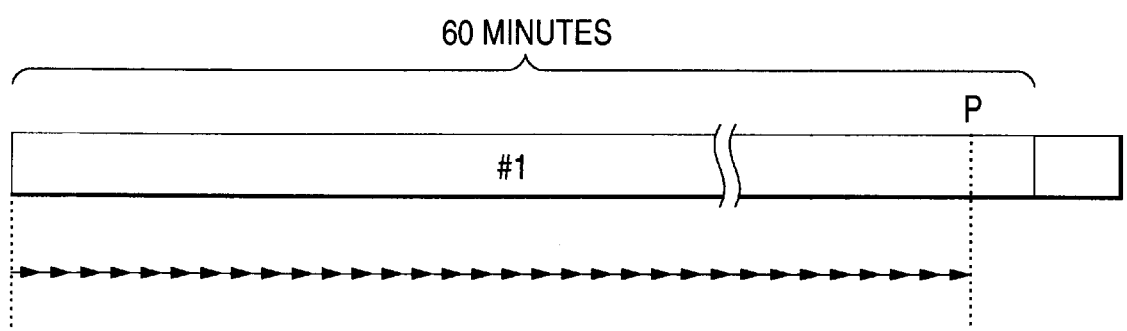

FIG. 9 is a flowchart showing the other embodiment and shows a case that the intermediate jump mode shown in FIG. 8 is omitted. In this case, in case X≦30 minutes, only a small jump mode is set and the operation in the steps S7, S10 and S17 shown in FIG. 8 is executed. In case 30 minutes<X, a time jump mode and a small jump mode are set and the operation in the steps S11 to S13, S16 and S17 shown in FIG. 8 is executed. In this case, the steps S11 and S12 can be also replaced with the steps S11a and S12a shown in FIG. 7 and a block jump mode can be adopted.

In the embodiments, the search mode is set according to the total recorded time of a track, however, a search mode may be also set according to the residual recorded time (the residual performance time) of a track being reproduced in place of the total recorded time.

In the embodiments, in case the search button 25 continues to be pressed, a search is at first performed in the small jump mode and afterward, the small jump mode is automatically switched to the intermediate jump mode, however, for a search button, a button for a small jump and a button for an intermediate jump may be also separately provided. A button for a time jump and a button for a block jump may be also separately provided.

The invention can be also applied to a player for CD-R and CD-RW or a player for DVD in addition to an MD player.

As according to the invention, a search can be efficiently performed using an optimum mode according to the recorded time of a track, time required for a search can be greatly reduced even if a part close to the end of a track having long recorded time is reproduced or edited.

What is claimed is:

1. A disk unit system for performing a non-uniform search, comprising:

a memory;

a search button for initiating a searching to a particular location to be reproduced or edited of information recorded on a disk;

a search mode controller that controls a search mode by the search button; and software instructions stored in the memory for enabling the disk unit system under control of the search mode controller to set the search mode in a track on the disk according to the total recorded time of the track recorded by manual track marking.

2. The disk unit system according to claim 1, wherein:

the software instructions stored in the memory enable the search mode controller to set the search mode to a small jump mode in which a search at a short step is performed if the total recorded time of one track is not longer than a predetermined time T1;

the software instructions stored in the memory enable the search mode controller to set the search mode to an intermediate jump mode in which a search at an intermediate step is performed and the small jump mode if the total recorded time of the track is longer than the predetermined time T1 and not longer than a predetermined time T2; and the software instructions stored in the memory enable the search mode controller to set the search mode to a time jump mode in which a jump is performed according to an input time from the search button, the intermediate jump mode and the small jump mode if the total recorded time of the track is longer than the predetermined time T2.

3. The disk unit system according to claim 2, wherein the software instructions stored in the memory enable the search mode controller to read the total recorded time of the track from the disk in reproducing the disk.

4. The disk unit system according to claim 2, wherein the software instructions stored in the memory enable the search mode controller to automatically switch from the small jump mode to the intermediate jump mode by continuous pressing of the search button.

5. The disk unit system according to claim 2, wherein the software instructions stored in the memory enable the search mode controller to enter the time jump mode and perform the jump up to a position equivalent to a time input by pressing the search button.

6. The disk unit system according to claim 2, wherein:

the software instructions stored is the memory enable the search mode controller to set a search mode to a block jump mode in which a jump in units of block is performed if the track is divided into the predetermined number of blocks in place of the time jump mode.

7. The disk unit system according to claim 1, wherein:

the software instructions stored in the memory enable the search mode controller to set the search mode to a small jump mode in which a search at a short step is performed and an intermediate jump mode in which a search at an intermediate step is performed if the total recorded time of the track is not longer than a predetermined time; and the software instructions stored is the memory enable the search mode controller to set the search mode to a time jump mode in which a jump is performed according to an input time from the search button, the intermediate jump mode and the small jump mode if the total recorded time of the track is longer than the predetermined time.

8. The disk unit system according to claim 1, wherein:

the software instructions stored in the memory enable the search mode controller to set the search mode to a small jump mode in which a search at a short step is performed if the total recorded time of the track is not longer than predetermined time; and the software instructions stored in the memory enable the search mode controller to set the search mode to a time jump mode in which a jump is performed according to an input time from the search button in and the small jump mode if the total recorded time of the track is longer than the predetermined time.

9. The disk unit system according to claim 1, wherein:

the software instructions stored in the memory enable the search mode controller to set the search mode in a track according to the residual recorded time of the track being reproduced in place of the total recorded time.

* * * * *